Jan. 17, 1939. C. O. BUCKELLEW 2,144,401
TRAILER HITCH
Filed July 21, 1937 2 Sheets-Sheet 1
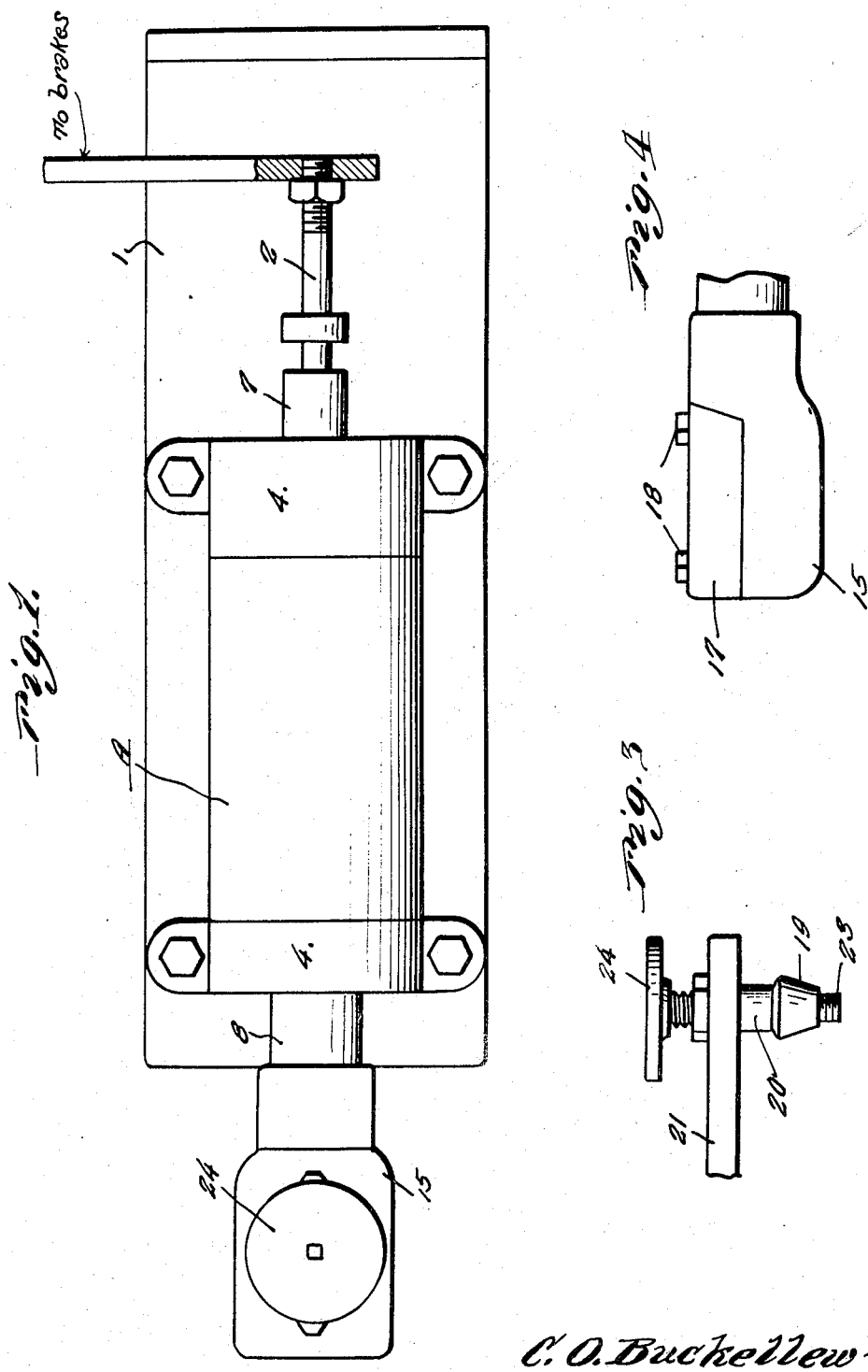
Inventor
C. O. Buckellew
By Clarence A. O'Brien
Hyman Berman
Attorneys Jan. 17, 1939.  C. O. BUCKELLEW  2,144,401
TRAILER HITCH
Filed July 21, 1937  2 Sheets-Sheet 2
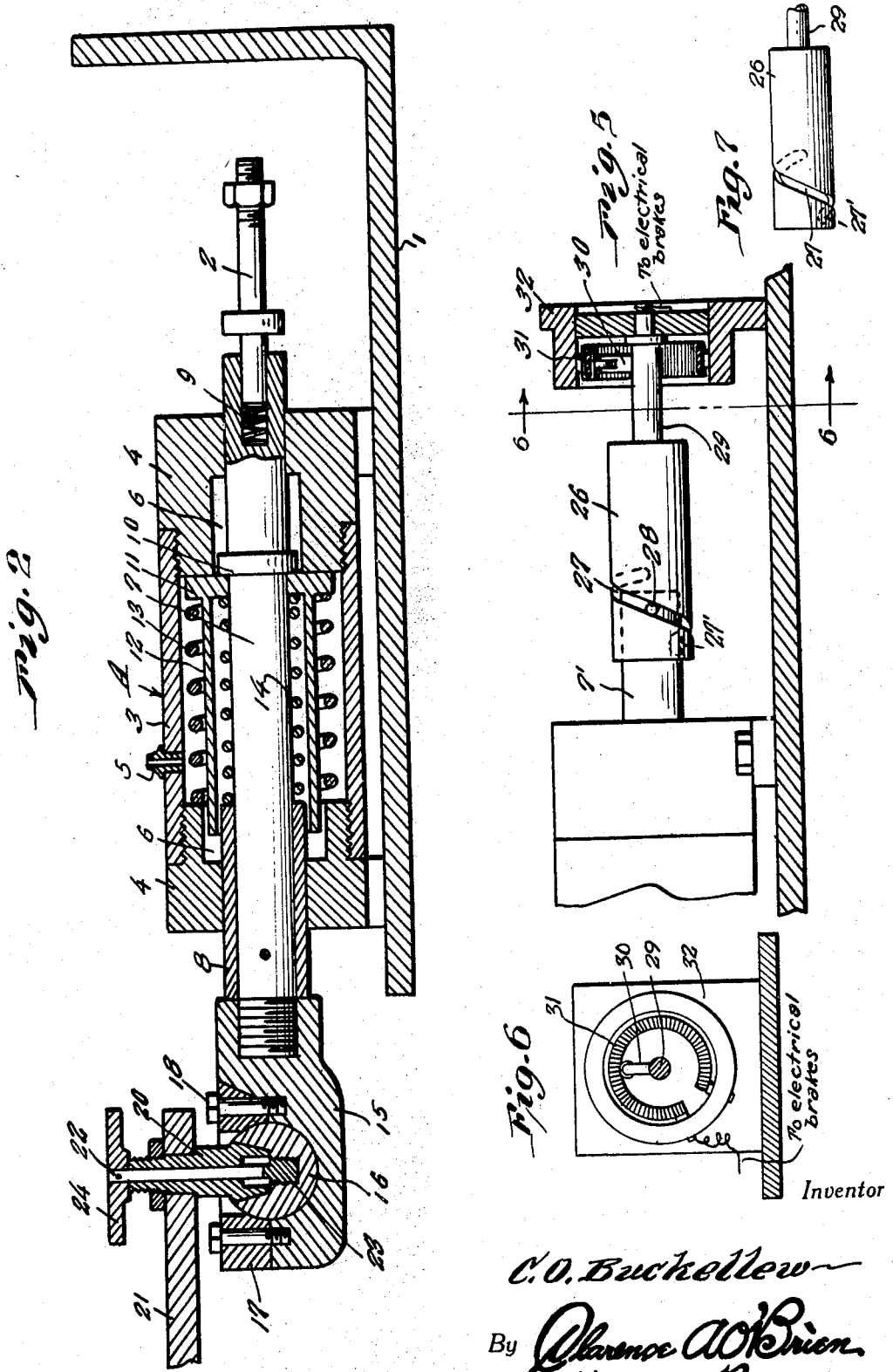
Inventor
C. O. Buckellew
By Clarence A. O'Brien
Hyman Berman
Attorneys Patented Jan. 17, 1939

2,144,401

UNITED STATES PATENT OFFICE 2,144,401

TRAILER HITCH

Cleveland O. Buckellew, Schulenburg, Tex.

Application July 21, 1937, Serial No. 154,886

3 Claims. (Cl. 188—142)

This invention relates to a hitch for connecting a trailer to a motor vehicle, the general object of the invention being to provide means for applying the brakes of the trailer when the trailer moves toward the vehicle to a predetermined distance so that further movement of the trailer toward the vehicle will be checked.

Another object of the invention is to provide spring means for resisting movement of that part of the device which is connected with the vehicle, in either direction relative to the part connected with the trailer, such means also acting to absorb the shock of the initial pull of the vehicle on the trailer.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the invention.

Figure 2 is a longitudinal sectional view through Figure 1.

Figure 3 is a side view showing the parts for connecting the draw bar of the vehicle to the ball in the head which is connected with the sliding shaft.

Figure 4 is an elevation of said head.

Figure 5 is a view showing the modification in which the brakes are operated by electric means.

Figure 6 is a section on the line 6—6 of Figure 5.

Figure 7 is a view of the sleeve containing the spiral slot.

In these drawings, the numeral 1 indicates a base which is adapted to be connected to a trailer and this base is to support a lever or other operating means for the hydraulic brakes of the trailer, said lever or other part being actuated by the shaft 2 in the usual or any desired manner. A cylinder A is supported on the base and includes the barrel 3 and the end pieces 4 which have reduced ends threaded in the ends of the barrel, the cylinder being adapted to receive lubricant which is introduced through the nipple 5. Each end piece has a small chamber 6 in its inner end and a shaft 7 passes through the cylinder and its end pieces and said chambers. A sleeve 8 is connected to the front end of the shaft and extends into the cylinder and the rear end of the shaft is formed with a socket which receives the front end of the shaft 2 and a spring 9 is located in the socket and bears against the end of the shaft 2. A collar 10 is formed on the shaft and is located in the chamber 6 of the rear end piece 4 and is adapted to engage the end piece 11 of a sleeve 12 located in the cylinder, when the shaft 7 moves forwardly. A large spring 13 surrounds the sleeve 12 and has one end bearing against the inner end of the front end piece 4 and its other end against the end piece 11 of the sleeve 12. A lighter spring 14 surrounds that part of the shaft 7 which passes through the sleeve 12 and has one end bearing against the end piece 11 of the sleeve 12 and its other end against the inner end of the sleeve 8 which is attached to the shaft 7. The front end of the sleeve 12 operates in the chamber 6 and the front end piece 4.

A head 15 has a threaded socket therein to receive the threaded front end of the shaft 7 and a ball 16 is removably held in a spherical socket in the head by the detachable part 17 of the head which is held in place by the bolts 18. The ball is formed with a tapered socket therein terminating in a threaded circular part and this socket receives the tapered end 19 of a tubular lug 20 which is adapted to be attached to the draw bar 21 of a motor vehicle. A shaft 22 passes through the lug and has a threaded head 23 at its inner end for engaging the threaded part of the socket in the ball, the outer end of the shaft having a handle 24 thereon.

Thus turning the handle 24 the shaft 22 can be unthreaded from the ball and moved into a socket in the part 19 and then the lug 20 can be pulled from the ball which will, of course, detach the draw bar of the vehicle from the trailer, the ball remaining in place so that it will not be damaged or collect dirt as it would if it is permitted to remain connected with the draw bar and removed from the head 15.

With the parts attached to the vehicle and the trailer, it will be seen, that upon the initial movement of the vehicle the shaft 7 will move forwardly in the cylinder A so that the collar 10 will engage the end piece 11 which moves forwardly with the shaft and thus will compress the spring 13 until the end of the sleeve 12 strikes the end piece 4 at the front end of the cylinder and then the pull of the vehicle on the trailer will be an unyielding one. The spring 13 thus absorbs the shock of the initial pull of the vehicle on the trailer. If the trailer should move toward the vehicle, such as when the vehicle stops or in traveling down a grade, the cylinder would move forwardly on the shaft but this movement would be resisted by the spring 14 engaged by the sleeve 8 attached to the shaft 7. If the forward movement of the trailer is sufficient to overcome the resistance of the spring 14, the spring 9 is compressed until the shaft 2 contacts the rear end of the shaft 7 and then the brakes of the trailer are applied and the trailer brought to rest, or the trailer is checked in its forward movement. The spring 9 will prevent application of the brakes with every slight movement of the trailer toward the vehicle and also acts to keep sudden stops of the vehicle from throwing the brakes on too fast.

Figures 5, 6 and 7 show the invention in use with electrical means for applying the brakes and in this case a sleeve 26 is provided with a spiral slot 27 for receiving a pin 28 on the rear end of the shaft 7' so that upon relative movement between the shaft and the sleeve the sleeve will be rotated. A shaft 29 is connected with the rear end of the sleeve and carries a brush arm 30 the brush of which is associated with a rheostat 31 carried by the support 32, this rheostat being electrically connected with the brake applying means in the usual or any desired manner. The slot is provided with a straight part 27' so that as the shaft 7' moves forward to let the brakes off, upon further movement of the shaft the pin will enter the straight part of the slot and thus the brakes will remain in inoperative position.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed as new is:—

1. Means for connecting a trailer to a vehicle comprising a cylinder on the trailer having internal chambers in its ends, a shaft passing longitudinally through the cylinder and through said chambers, means for connecting the shaft to the vehicle, a sleeve in the cylinder having an end piece at its read end through which the shaft passes and said shaft having a collar thereon normally located in the chamber of the rear end piece and engaging the end piece of the sleeve when the shaft moves forwardly, the front end of the sleeve being located in the front chamber and normally spaced from the forward end of said chamber but engaging said end when the shaft moves forwardly a certain distance, a spring surrounding the sleeve and having one end bearing against the end piece of the sleeve and its other end against that part of the forward end of the cylinder which surrounds the front chamber, a spring within the sleeve and surrounding the shaft and having one end bearing against the end piece of the sleeve, a projection on the shaft and extending into the front end of the sleeve and bearing against the front end of the second spring and means at the rear end of the shaft for applying the brakes of the trailer by the shaft when the cylinder moves forwardly on the shaft.

2. A hitch for connecting a trailer to a vehicle comprising a cylinder on the trailer, a shaft connected with the vehicle and passing through the cylinder, spring means for resisting relative movement between the shaft and the cylinder and means for applying the brakes of the vehicle upon forward movement of the cylinder on the shaft, said means including a sleeve on the rear end of the shaft having a spiral slot therein, a pin carried by the shaft engaging the slot and a rheostat forming part of the brake means and a brush actuated by movement of the sleeve over the rheostat.

3. Means for connecting a trailer to a vehicle comprising a cylinder on the trailer having internal chambers in its ends, a shaft passing longitudinally through the cylinder and through said chambers, means for connecting the shaft to the vehicle, a sleeve in the cylinder having an end piece at its rear end through which the shaft passes and said shaft having a collar thereon normally located in the chamber of the rear end piece and engaging the end piece of the sleeve when the shaft moves forwardly, the front end of the sleeve being located in the front chamber and normally spaced from the forward end of said chamber but engaging said end when the shaft moves forwardly a certain distance, a spring surrounding the sleeve and having one end bearing against the end piece of the sleeve and its other end against that part of the forward end of the cylinder which surrounds the front chamber, a spring within the sleeve and surrounding the shaft and having one end bearing against the end piece of the sleeve, a projection on the shaft and extending into the front end of the sleeve and bearing against the front end of the second spring and means at the rear end of the shaft for applying the brakes of the trailer by the shaft when the cylinder moves forwardly on the shaft, said means including a brake shaft extending into a socket at the rear end of the first-mentioned shaft and a spring in the socket against which the front end of the brake shaft bears.

CLEVELAND O. BUCKELLEW.